US010921152B2

(12) United States Patent
Colasanti et al.

(10) Patent No.: US 10,921,152 B2
(45) Date of Patent: Feb. 16, 2021

(54) DATA PROCESSING METHOD FOR SYNTHESIZING IN REAL TIME CUSTOMIZED TRAFFIC INFORMATION

(71) Applicant: DUEL S.R.L., Rome (IT)

(72) Inventors: Riccardo Colasanti, Rome (IT); Antonio Di Noto, Rome (IT)

(73) Assignee: Duel S.R.L., Rome (IT)

( * ) Notice: Subject to any disclaimer, the term of this patent is extended or adjusted under 35 U.S.C. 154(b) by 2 days.

(21) Appl. No.: 16/331,230

(22) PCT Filed: Jun. 8, 2018

(86) PCT No.: PCT/IB2018/054149
§ 371 (c)(1),
(2) Date: Mar. 7, 2019

(87) PCT Pub. No.: WO2018/229614
PCT Pub. Date: Dec. 20, 2018

(65) Prior Publication Data
US 2019/0277652 A1 Sep. 12, 2019

(30) Foreign Application Priority Data

Jun. 12, 2017 (IT) .......................... 102017000064752

(51) Int. Cl.
*G01C 21/36* (2006.01)
*G01C 21/34* (2006.01)
*G01C 21/32* (2006.01)

(52) U.S. Cl.
CPC ......... *G01C 21/3691* (2013.01); *G01C 21/32* (2013.01); *G01C 21/3484* (2013.01); *G01C 21/3492* (2013.01)

(58) Field of Classification Search
CPC .................................................. G01C 21/3691
See application file for complete search history.

(56) References Cited

U.S. PATENT DOCUMENTS

| 6,219,833 B1* | 4/2001 | Solomon ................. G06F 8/447 |
| | | 712/15 |
| 2002/0103631 A1* | 8/2002 | Feldmann ............... H04L 41/12 |
| | | 703/22 |

(Continued)

FOREIGN PATENT DOCUMENTS

| WO | 2012092519 A1 | 7/2012 | |
| WO | WO-2018001444 A1 * | 1/2018 | ........... G08G 1/0112 |

OTHER PUBLICATIONS

International Search Report and Written Opinion for PCT/IB2018/054149 dated Sep. 11, 2018.

*Primary Examiner* — Alex C Dunn
(74) *Attorney, Agent, or Firm* — Thomas | Horstemeyer LLP (57) ABSTRACT

A data processing method (100) for synthesizing in real time customized traffic information for a user who wants to reach a destination position from a departure position, the data processing method (100) comprising the steps of: —obtaining (103) data which define a topological graph, said topological graph being an oriented graph containing information on the connection between segments of a road network, said topological graph comprising nodes which represent points of connection between two adjacent segments and arcs which connect nodes and which correspond to road or carriageway segments; —generating (104) data which define a routes graph (Gp), the routes graph (Gp) being a subset of the topological graph, having a departure node (10) associated with the departure position, a destination node (20) associated with the destination position, intermediate nodes between the departure node (10) and the destination node (20), arcs (1-5) which connect the nodes of the routes graph to one another, the generating step (104) comprising an operation of identifying on the routes graph a plurality of alternative routes which extend from the departure node (10)

(Continued)

to the destination node (20) of the routes graph passing through intermediate nodes and arcs of the routes graph (Gp); —noting (105) traffic and/or weather data on the routes graph (Gp) and obtaining data adapted to define an annotated routes graph; —obtaining (106) data adapted to define a simplified routes graph reducing the number of intermediate nodes of the annotated routes graph by defining aggregate segments as sequences of arcs of the same alternative route which meet one or more homogeneity criteria of the traffic and/or weather data.

16 Claims, 3 Drawing Sheets

(56) References Cited

U.S. PATENT DOCUMENTS

| | | | |
|---|---|---|---|
| 2014/0122032 A1* | 5/2014 | Zou | G06N 3/126 |
| | | | 703/2 |
| 2015/0219463 A1* | 8/2015 | Kang | G08G 1/143 |
| | | | 701/117 |
| 2016/0153787 A1* | 6/2016 | Dong | G01C 21/26 |
| | | | 701/533 |
| 2018/0061242 A1* | 3/2018 | Bavar | B60W 50/082 |
| 2018/0336781 A1* | 11/2018 | Jin | G08G 1/07 |
| 2019/0164418 A1* | 5/2019 | Neukart | G08G 1/0145 |
| 2019/0295421 A1* | 9/2019 | Bavar | G06Q 10/04 |

\* cited by examiner

DATA PROCESSING METHOD FOR SYNTHESIZING IN REAL TIME CUSTOMIZED TRAFFIC INFORMATION

CROSS-REFERENCE TO RELATED APPLICATIONS

This application is the 35 U.S.C. § 371 national stage application of PCT Application No. PCT/IB2018/054149, filed Jun. 8, 2018, where the PCT claims the priority to and benefit of Italian Patent Application No. 102017000064752, filed Jun. 12, 2017, both of which are herein incorporated by reference in their entireties.

The present description concerns the technical field of vehicle drive assistance software, and in particular relates to a data processing method for synthesizing in real time customized traffic information.

Various IT tools and methods, which allow a user to obtain real-time information about traffic, practicability and route to be followed to reach a desired destination, are currently known and widespread.

Although widely used, current IT tools and methods do not allow to provide a user with particularly concise and intelligible information on practicability, traffic, possible routes or, in general, on any factors which may influence the drive or choice of the path to follow. Furthermore, current IT tools and methods do not allow customization possibilities or allow relatively limited customization possibilities, where synthesis is delegated to the user, also requiring interaction.

The need is therefore felt for an IT tool and method autonomously offering an immediately intelligible customized synthesis, in good time for the drive and route choices, while at least partially overcoming the drawbacks and limitations of the IT tools described above with reference to the background art.

It is the object of the present description to provide a data processing method which is capable of meeting the above-mentioned need.

Such an object is achieved by a data processing method for synthesizing in real time customized traffic information as generally defined in claim 1. Preferred and advantageous embodiments of the aforesaid data processing method are defined in the appended dependent claims.

The invention will be better understood from the following detailed description of particular embodiments thereof, given by way non-limiting example, with reference to the accompanying drawings, in which.

With reference to the accompanying drawings, embodiments of a data processing method 100 for synthesizing in real time customized traffic information will be described below.

In the embodiments which will be described below, such a data processing method 100 allows, in particular, to provide a user with concise and customized traffic newscast, for example by means of an operation of speech synthesizing a selected number of traffic news. In any case, the aforesaid data processing method 100 may be defined as a data processing method for the production of a traffic newscast, or more simply as a method for the production of a traffic newscast.

The data processing method 100 described below allows to synthesize in real time customized traffic information for a user who wants to reach a destination position from a departure position.

The data processing method 100 comprises a series of steps which will be described below mainly with reference to FIG. 1. Such steps may be performed in the sequence shown in FIG. 1, but this does not limit the data processing method 100 to such a specific sequence, since alternative sequences may be provided, which still ensure a correct operation of the data processing method 100. Where, instead, there are some advantageous or convenient aspects in the order of the steps, this will be specified in the course of the following description.

The aforesaid data processing method 100 may, for example, be performed by a distributed hardware and software system comprising a client data processing device (in brief, "client"), such as, for example, a smartphone, supplied to a user, and at least one data processing server (in brief, "server"), to which the smartphone is operatively connected, for example by means of a wireless data connection. In a further embodiment, the client may comprise dedicated hardware provided on board a vehicle, alternatively or in addition to the smartphone.

The server comprises or is operatively connected to one or more computer databases, primarily employable as data sources for the data processing method 100.

Figure 1:
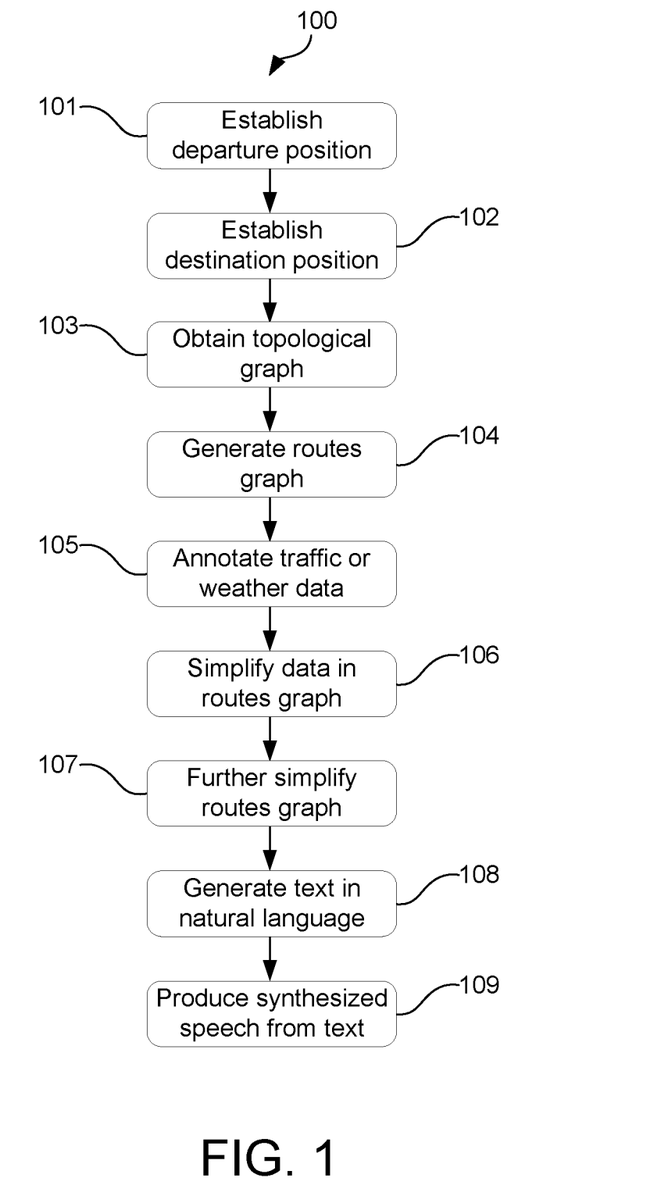
FIG. 1 shows a schematic flow chart of an embodiment of a data processing method for synthesizing in real time customized traffic information.

With reference to FIG. 1, the data processing method 100 preferably comprises a step of establishing 101 a departure position. For example, the step of establishing 101 the departure position comprises an operation of automatically detecting the departure position by means of a satellite positioning system, for example provided on board the client. Alternatively, the departure position may be a position entered, for example typed or vocally dictated, by a user. The departure position may be a specific location, for example indicated by a toponym, an address, a street, or indicated by coordinates in a geo-referenced positioning system, or a specific address, or a previously entered mnemonic identifier (for example "home", or "work", or "gym"), etc.

The data processing method 100 preferably comprises a step of establishing 102 at least one destination position. For example, the step of establishing 102 the destination position comprises an operation of automatically estimating the destination position or of determining it by selecting it, for example, from a list of destination positions marked as preferred by the user or automatically identified as preferred or habitual for the user, possibly also in relation to the departure position. Alternatively, the destination position may be a position entered, for example typed or vocally dictated, by a user. The destination position may also be a specific location, for example indicated by a toponym, an address, a street, or indicated by coordinates in a geo-referenced positioning system, or a specific address, or a previously entered mnemonic identifier (for example "home", or "work", or "gym"). The destination position may also be a position (such as, for example, an intermediate position) identifying a possible movement direction (for example, "towards the district Name District" or "towards the sea" or "towards the ring road" or "towards the south" etc.).

In accordance with an embodiment, during the establishing step 102, a plurality of destination positions is established, and the steps of the data processing method 100, which will be described below, may be performed for each of said destination positions.

The data processing method 100 further comprises a step 103 of obtaining data which define a topological graph G, i.e., data suitable for defining said graph G. The topological graph G is an oriented graph containing information on the connection between segments of a road network. It comprises nodes which represent points of connection between two adjacent segments and arcs which connect nodes and which correspond to road or carriageway segments.

The step 103 of obtaining the topological graph G is preferably performed off-line, for example once for all before performing the steps 101 and 102 described above; however, it is possible to provide that such a step 103 is performed periodically, to update the topological graph G previously obtained.

The topological graph G (i.e., the set of data defining it) is for example obtained from one or more graphs of the road network. Such graphs of the road network are, for example, taken from commercial or public cartographic databases or by means of ETL (Extract, Transform, Load) procedures.

In accordance with an advantageous embodiment, the step of obtaining the topological graph G comprises a step of noting the arcs of the topological graph G with the information belonging to the following list, taken individually or as a whole or according to all possible combinations:

Toponyms—available both as plain text and expressed in a phonetic alphabet (IPA, SAMPA, etc.), useful for improving pronunciation in the case of speech synthesis;

Administrative areas (cities, provinces, etc.) to which the road belongs;

Functional Road Class (FRC), i.e., a standard classification based on the relevance of the road to which the arcs belong;

Form of Way (FOW), i.e., a standard classification based on the physical features of the road to which the arcs belong;

Length of the arcs;

Transit times required to travel them;
  Transit restrictions (one-way roads, temporary closures, etc.) and related time slots.

In the remainder of the present description, the elements of the topological graph G will be identified as follows:

$N_i$ indicates the i-th node;

$E_{ij}$ indicates the arc from the node i to the node j;

$\|E_{ij}\|$ indicates the length of the arc from the node i to the node j.

Opening now a parenthesis with respect to the partial description of the data processing method 100 provided above with reference to FIG. 1, further data structures, quantities and information will be described below, preferably employed by the data processing method 100 separately or in combination with one another.

Geometric Graph

The geometric graph $G^G$ contains the detailed geometry of the arcs of the topological graph G. It is preferably used for reverse-geocoding and of path-inference operations, useful for mapping, to the topological graph G, the routes of the user or the geo-referenced traffic information as coordinates or in OpenLR standard. Reverse-geocoding means the operation of tracing back, given the coordinates of one point, the arc or node which is nearer to a graph. Path-interference means the operation of determining, from a sequence of geometric coordinates, the arc sequence of the topological graph which corresponds thereto.

Speeds Graph

The average speed data provider uses a speeds graph $G^V$ to geo-reference the measurements in real time. Generally, the arcs of this graph do not coincide with those of the topological graph G and may change over time, therefore, a mapping operation between the two graphs is required.

RDS-TMC Graph

The RDS-TMC graph $G^R$ is a topological graph which contains information on the main road network of a nation or of a region, and to which traffic information originating from TICs (Traffic Information Centers) is often referred. Also in this case, it is generally necessary to perform mapping operations to report the information referred to this graph on the topological graph G.

Traffic Information

The data processing method 100 preferably employs four types of information on the real-time traffic situation:

average speeds of vehicles, measured by sensors and/or floating cars;

quantities which characterize traffic, obtained from the average speeds, such as travel times;

statistical data on the average speeds;

traffic events, reported by national and/or regional TICs.

Average Speeds of Vehicles

The average speed data, measured in real time on the arcs $E_{ij}^V$ of the graph $G^V$, preferably comprise the following information:

a timestamp identifying the time which the measurements correspond to;

an identifier $E_{ij}^V$ of the arc which the measurements refer to;

the average speed $V_{ij}^V$ measured on the arc from i to j of the graph $G^V$;

the free-flow speed, $V_{ij}^f$ on the same arc;

the level of confidence of the measurement $C_{ij} \in [0 \ldots 1]$.

The data are provided by third parties which use, for the acquisition and the update, fixed measurement stations and/or floating cars.

In order to easily use the data, they are preferably mapped to the topological graph G, identifying the arc sequence $\{E_{kl}\}$ which corresponds to an arc of the speeds graph $E_{ij}^V$. In the following of the present description, the speeds are understood to be already mapped to the topological graph G:

$V_{ij}$ is the average speed measured on the arc $E_{ij} \in G$;

$V_{ij}^f$ is the free-flow speed measured on the arc $E_{ij} \in G$.

Free-flow speed means the speed on a segment of road measured when the road network is empty.

Other Quantities which Describe the Traffic

Traffic intensity in an arc is defined from the ratio of the two quantities:

$$I_{ij} = 1 - \frac{V_{ij}}{V_{ij}^f} = 1 - \frac{\|E_{ij}\|}{T_{ij}} \frac{T_{ij}^f}{\|E_{ij}\|} = 1 - \frac{T_{ij}^f}{T_{ij}} \in [0 \ldots 1]$$

where:

$T_{ij}$ is the travel time of the arc $E_{ij}$ at a speed $V_{ij}$;

$T_{ij}^f$ is the travel time of the arc $E_{ij}$ at a speed $V_{ij}^f$;

Intensity equal to 1 indicates an almost blocked traffic ($V_{ij} \approx 0$), intensity equal to zero indicates the absence of traffic ($V_{ij} \approx V_{ij}^f$).

The traffic intensity of two consecutive arcs $E_{ki}$ and $E_{kj}$, useful in the clustering step 106 which will be described below, is obtained as follows:

$$I_{kj} = 1 - \frac{T_{ki}^f + T_{ij}^f}{T_{ki} + T_{ij}}$$

Traffic Level

The traffic level is the result of the (uneven) quantization of traffic intensity $I_{ij}$, necessary to qualitatively describe traffic intensity. The number and the value of the thresholds used for the quantization vary according to the style of the information to be supplied to the user by means of the newscast produced by the data processing method 100. An example is listed in the following table:

| Intensity | Level | Qualitative description |
| --- | --- | --- |
| $0 \leq I_{ij} < 0.6$ | 0 | Absence of traffic |
| $0.6 \leq I_{ij} < 0.8$ | 1 | Heavy traffic |
| $0.8 \leq I_{ij} < 0.9$ | 2 | Slow moving traffic |
| $0.9 \leq I_{ij} \leq 1$ | 3 | Queues |

Delay

Delay is a quantity used to determine the severity of a traffic event more completely than how it is possible with intensity alone. It is defined as the difference between the time a vehicle employs to travel a portion of the graph and the time which would be required under free-flow conditions:

$$D_{ij} = \|E_{ij}\| \frac{V_{ij}^f - V_{ij}}{V_{ij} \cdot V_{ij}^f} \in 0 \ldots \infty$$

In percentage terms, on a subset P of the graph $G^P$:

$$D_{ij}^P = \frac{D_{ij}}{\sum_{i,j \in P} D_{ij}}$$

Both quantities are used to determine how severe a slowdown is, both in absolute terms ($D_{ij}$) and in relative terms ($D_{ij}^P$), useful for the ranking step.

Statistical Traffic Data

Real-time average speed data form the basis for calculating statistical data used to represent the typical traffic situation:

the expected value of the average speed on each arc of the graph G:

$$\overline{V}_{ij} = E[V_{ij}]$$

the variance of the average speed:

$$\sigma_{ij}^2 = E[(V_{ij} - \overline{V}_{ij})^2]$$

both data are calculated on a sufficiently wide time frame (for example, equal to two weeks) and for different time slots and days of the week.

Traffic Events

Traffic events means accidental circumstances (e.g., accidents, landslides, breakdowns, etc.) or interventions by road network operators (e.g., carriageway exchanges, works, closures) which influence the flow of vehicular traffic.

They preferably consist of discrete information such as:
a code identifying the type of event (such as, for example, an accident);
any attributes specifying the details thereof;
the geo-referencing of the event, describing the position thereof;
a severity level established by the supplier;

In the data processing method 100, the events published by the main national and regional TICs, which are used to enrich the information provided to the user by means of the newscast produced by the data processing method 100, are preferably received and analyzed.

Generally, events are geo-referenced on a specific graph $G^E$ of the TIC from which the information originates from or on a standard graph (e.g., RDS-TMC). Preferably, the information is mapped to the arcs of the topological graph G as follows:

for linear events, geo-referenced as a sequence of coordinates, a path inference operation is used to map the arcs of the graph $G^E$ to those of the graph G;

for isolated events, a circular area of influence is defined, with radius ρ, around the coordinates of the event, and the arcs of G are selected, the geometry of which intersects the area of influence. The radius is defined according to different parameters:
the style of the newscast;
the FRC of the road closest to the point;
the FOW of the road closest to the point;

for events geo-referenced as area A (for example Limited Traffic Areas—ZTLs), the arcs of G are selected, the geometry of which is, at least partially, contained in A.

Weather Data and Events

Weather data consist of both measurements (temperature, humidity, etc.) and events (heavy snowfall, rains, etc.), provided by third parties and updated several times throughout the day.

Weather data are, for obvious reasons, always geo-referenced on an area. They are mapped to the topological graph G similarly to how it is described above.

The data processing method 100 preferably allows to automatically produce weather events from the following raw data provided by the weather services:
temperature;
type and intensity of precipitation;
wind;
when these exceed threshold values.

Weather events are always geo-referenced in an area, therefore the area of influence thereof is defined similarly to that of traffic events.

User Data

In accordance with a preferred embodiment, the data processing method 100 acquires, in a completely anonymous manner, the spatial coordinates of the vehicle on which the user is located during his/her journey, for example by acquiring the position of the client.

The data acquired are used both to improve the service and for the user him/herself, as well as for all users who have similar features.

Preferably, the data processing method 100 comprises a step of calculating some additional data, such as:
user destinations, by time slot and day of the week;
routes traveled by the user to reach a destination, divided by time slot and day of the week.

The aforesaid data are advantageously used by the data processing method 100 to improve the information content of the newscast.

Format of the Newscast

In accordance with an advantageous embodiment, the data processing method 100 allows to customize and diversify the user experience by defining a format for the newscast, which consists of the set of parameters which drive the composition thereof and the meaning of which will be detailed with reference to steps 106 to 108, described below:

$N_x$: maximum number of news items in the newscast;

$N_T$: maximum number of events groupable by toponym;

$D_x$: distance from the departure point within which the events are taken into account;

$\Theta_S$: minimum travel time for the segments of the routes graph $G^P$;

$\Theta_D$: minimum delay time for the segments of the routes graph $G^P$;

$\Theta_E$: threshold of the percentage difference of the arrival time of two routes;

$\Theta_L$: threshold of the length difference of the routes;

$\Lambda_T$: minimum level of traffic to be taken into account;

$\Theta_G$: event severity threshold;

$\Delta_L$: maximum difference allowed between the maximum traffic level of a set of arcs and the overall arc traffic level during the clustering step 106 which will be described below;

and of other elements such as:

the dictionary used for generating the language, containing the sentences used to describe the events;

the criteria for sorting out the information to be presented to the user;

a template describing the various elements in the newscast.

With reference again to FIG. 1, the further steps of the data processing method 100 will be described below.

Figure 2:
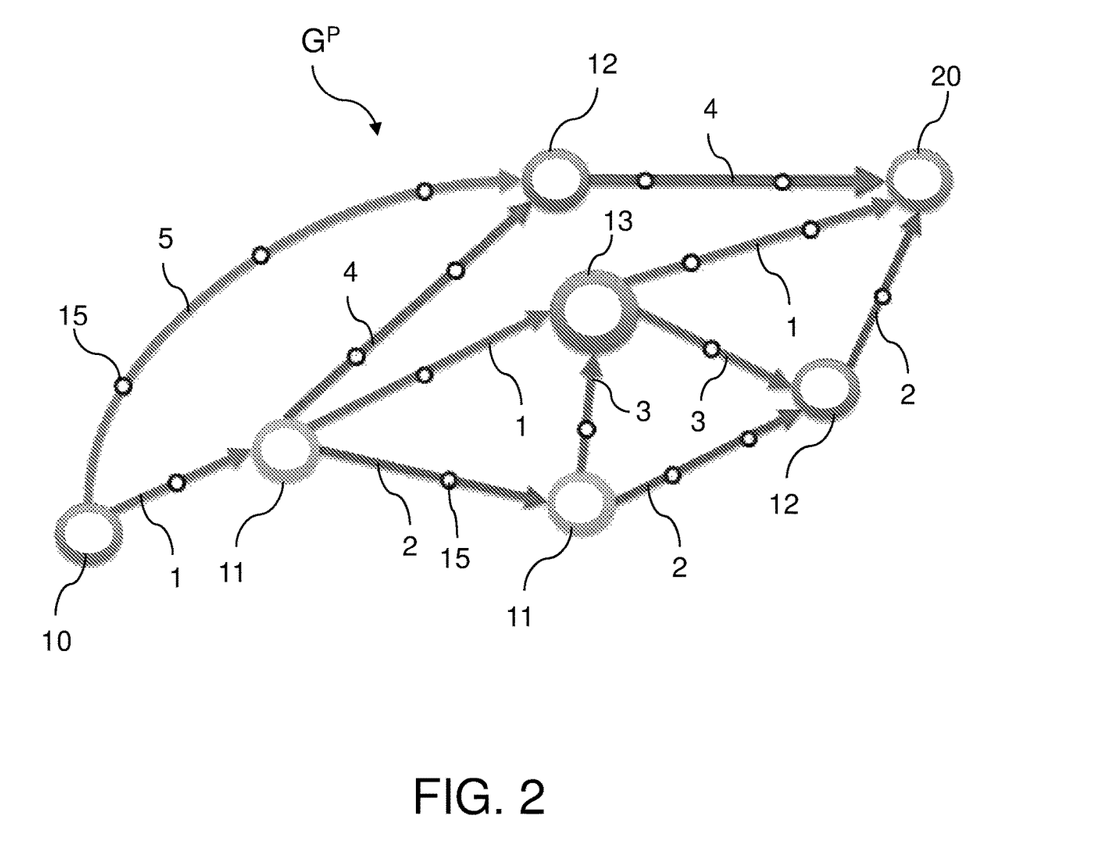
FIG. 2 shows an example of a routes graph which can be obtained by the data processing method in FIG. 1.

The data processing method 100 comprises a step 104 of generating data which define a routes graph $G^P$, the routes graph $G^P$ being a subset of the topological graph G, having a departure node 10 associated with the departure position, a destination node 20 associated with the destination position, intermediate nodes 11-13 between the departure node 10 and the destination node 20, arcs 1-5 which connect the nodes 10,20, 11-13 of the routes graph $G^P$ to one another. An example of routes graph is shown in FIG. 2.

The aforesaid step of generating 104 the routes graph $G^P$ comprises an operation of identifying on the topological graph G a plurality of alternative routes which extend from the departure node to the destination node of the routes graph passing through intermediate nodes and arcs of the routes graph $G^P$.

The routes graph $G^P$ is generated by the data processing method 100 as a subset of the topological graph G consisting of the arcs belonging to at least one of the routes $P_i$ which the user may choose for reaching the destination position:

$$G^P = U_i P_i \subset G.$$

The alternative routes composing the routes graph $G^P$ are, for example, identified by performing calculations with optimization algorithms whose cost functions are defined for different objectives, with the aim of reflecting the user's needs and habits.

Preferably, the aforesaid alternative routes comprise at least one main route, which is the fastest one, from the departure node 10 to the destination node 20, obtained by using real-time travel times $T_{ij}$ as a cost. More preferably, the main routes are three and are obtained as described above. In FIG. 2, the three main routes are the routes:

1-1-1;

1-2-2-2;

1-2-3-3-2.

Preferably, the aforesaid alternative routes comprise at least one of the three additional routes, more preferably all three, listed below:

1. the fastest typical route 1-4-4, obtained by using the average travel times for the day of the week and the time slot in which the request is made $$\bar{T}_{ij} = \frac{\|E_{ij}\|}{\bar{V}_{ij}}$$

2. the route habitually preferred by the user, using a cost function which favors the roads habitually traveled by the user;

3. the fastest route with the empty road network 1-5-4, i.e., the route which is the fastest, taking into account only free-flow travel times $T_{ij}^f$.

In the data processing method 100 it is preferably assumed that the most relevant routes for the user are the main ones, which are described in the newscast with the greatest possible level of detail. The additional routes are used for exceptions, i.e., only if traffic anomalies are reported therein, such as to discourage the adoption thereof.

For example, under normal conditions, the typical route coincides with one of the fastest ones and it is very likely that the user will use it, especially if he/she is a commuter. In exceptional circumstances, determined by severe anomalies, the typical route may not be among the fastest; however, it is necessary to inform the user about the reasons why choosing the typical route is not appropriate.

The routes graph $G^P$ generated in step 104 preferably has a structure (for example, similar to that in FIG. 2), having different types of nodes:

terminal nodes, i.e., the departure 10 and arrival 20 ones;

decision nodes 11, from which two or more possible routes branch off;

joining nodes 12, into which two or more routes converge internal nodes 15, which delimit the original arcs of the topological graph G and are partly eliminated during the clustering step 106.

Some of the nodes of the routes graph $G^P$, for example node 13, may be both decision nodes and joining nodes at the same time.

The arc sequences of the routes graph $G^P$ between two non-internal nodes are called segments $S_{ij}$. They are road segments which the user will travel in full and therefore constitute the basic units for the description of the traffic in the newscast.

With reference again to FIG. 1, the data processing method 100 further comprises a step of noting 105 traffic and/or weather data on the routes graph so as obtain an annotated routes graph. In addition to the traffic and/or weather data, in accordance with a non-limiting embodiment, during the noting step 105 also toponymic data are noted.

Preferably, the noting step 105 comprises an operation of associating, with the arcs of the routes graph $G^P$, the weather and traffic data traffic provided as input to the data processing method 100, summarized below:

real-time traffic data;

statistical traffic data;

traffic events affecting the arc;

weather information of the areas in which the arcs are.

The information is associated with all the arcs of the routes graph $G^P$ in the area of influence of each event.

It has been observed that the information associated with the arcs of the annotated routes graph is still too detailed to be useful while driving.

The amount of information present in the annotated routes graph is determined by the variations in the data associated with the arcs of the graph along the positive direction (i.e., the direction of travel from the departure node to the destination node) of the segments of the graph $G^P$. Said variations are due, for example, to:
- change of toponym;
- change in traffic level;
- start/end of a traffic event;
- start/end of a weather event;
- start/end of an RDS-TMC node.

Due to the mode in which the annotated routes graph is generated, such variations may occur only at a node belonging thereto.

Due to the aforesaid reasons, the data processing method 100 further comprises a step 106 of processing the annotated routes graph, so as to obtain a simplified routes graph reducing the number of intermediate nodes of the annotated routes graph by defining aggregate segments as sequences of arcs of a same alternative route which meet one or more homogeneity criteria of the traffic and/or weather data. This step 106 may be defined as a clustering step 106. In accordance with an advantageous and non-limiting embodiment, the homogeneity criteria also relate to the toponymic data.

The clustering step 106 merges the arcs composing the segments belonging to the annotated routes graph which share an internal node, so as to generate aggregated segments, and with the object of reducing the variations, minimizing the amount of information lost. Preferably, decision and joining nodes are not modified during the clustering step 106.

The clustering step 106 preferably comprises the following three sub-steps:
- grouping the homogeneous arcs by traffic level;
- grouping the arcs with non-homogeneous traffic information;
- eliminating the arcs which are traffic-free.

Said $E_{ij}$ and $E_{jk}$ two consecutive arcs, separated by the node j, the clustering step 106 allows to eliminate the node j and to replace the two arcs with a single arc $E_{ik}$ with the following features:

$$\|E_{ik}\| = \|E_{ij}\| + \|E_{jk}\|$$

$$T_{ik} = T_{ij} + T_{jk}$$

$$I_{ik} = 1 - \frac{T_{ij}^f + T_{jk}^f}{T_{ij} + T_{jk}}$$

Furthermore, the following information is preferably associated with the arc $E_{ik}$:
- the union of the lists of traffic events associated with $E_{ij}$ and $E_{jk}$;
- the union of the lists of weather events associated with $E_{ij}$ and $E_{jk}$;
- the union of the lists of traffic toponyms associated with $E_{ij}$ and $E_{jk}$.

Advantageous embodiments of the three abovementioned sub-steps of the clustering step 106 will be described below.

Grouping the Homogeneous Arcs by Traffic Level

The first sub-step of the clustering step 106 provides, so as to define aggregate segments, for the grouping of the arcs with similar traffic features, such as:
1. arcs for which measurements or traffic events are not available; and/or
2. arcs with homogeneous traffic level.

Grouping the Arcs with Non-Homogeneous Traffic Information

The grouping of the arcs with inhomogeneous traffic information, performed during the second sub-step of the clustering step 106, is preferably based on the iterative algorithm described below:
a) the arc $E_{ij}$ with the shortest non-zero delay time $D_{ij}>0$ is selected;
b) the two arcs $E_{ki}$ on the left and $E_{jl}$ on the right of $E_{ij}$ with their respective delays $D_{ki}$ and $D_{jl}$ are considered;
c) the arc with the shortest non-zero delay time between $E_{ki}$ and $E_{jl}$ is selected;
d) assuming, without loss of generality, that $E_{ki}$ is the selected arc, $E_{ki}$ and $E_{ij}$ may be grouped together if at least one of the following conditions occurs:
   the sum of the delays thereof is less than a threshold $D_{ki}+D_{ij}\leq\Theta_D$;
   the overall traffic level $L_{kj}$, corresponding to the overall traffic intensity $I_{kj}$ calculated with the equation $$I_{kj} = 1 - \frac{T_{ki}^f + T_{ij}^f}{T_{ki} + T_{ij}}$$

satisfies the condition:

$$L_{kj} \geq \max(L_{ki}, L_{ij}) - \Delta_L$$

e) if the two arcs may be grouped, a new arc $E_{kj}$ is generated, replacing $E_{ki}$ and $E_{ij}$.

The iterative cycle of the abovementioned algorithm preferably ends when there are no more arcs which may be grouped to define an aggregate segment or when the iterations performed have reached a selected threshold number.

Eliminating the Arcs which are Traffic-Free

At the end of the second sub-step of the clustering step 106, the segments of the resulting routes graph consist of relatively homogeneous traffic areas interspersed with others without traffic or information.

The third sub-step of the clustering step 106 allows to eliminate some of the latter and thus to merge two adjacent traffic areas.

Preferably, the algorithm used is, once again, iterative and comprises the following operations:
a) the arc $E_{ij}$ without traffic, with the shortest travel time (this information is present in the base graph G) is selected;
b) the arc preceding $E_{hi}$ and that following $E_{jk}$ are considered;
c) the three arcs are grouped together if the travel time $T_{hk}$ of the overall arc $E_{hk}$ satisfies the relation $$T_{hk} \leq \Theta_D$$

where the travel time $T_{hk}$ of the overall arc $E_{hk}$ is conveniently calculated as follows:

$$T_{hk} = T_{hi} + 2\frac{\|E_{ij}\|}{(V_{hi} + V_{jk})} + T_{jk}.$$

In accordance with a particularly advantageous embodiment, after the clustering step 106, the data processing method 100 comprises a step 107 of further simplifying the simplified routes graph. If the simplified routes graph comprises decision nodes and/or joining nodes and/or alternative routes, the aforesaid step of further simplifying 107 the simplified routes graph comprises one or more of the three sub-steps of the following list:
- simplifying the alternative routes (for example, simplifying the additional routes);
- eliminating an alternative route (for example, eliminating one of the faster routes, in case there are more than one);
- merging decision nodes and/or joining nodes.

In case the aforesaid step of further simplifying 107 the simplified routes graph comprises two or more of the three preceding sub-steps, all combinations of two or three sub-steps of the abovementioned list are possible.

Advantageous embodiments of the three abovementioned sub-steps of step 107 will be described below.

Simplifying Additional Routes

As mentioned above, the additional routes are used for exceptions, i.e., to warn the user about severe events which discourage the adoption thereof. For this reason, it is often possible to eliminate some segments belonging thereto without decreasing the amount of information present in the newscast.

Preferably, the segments $S_{ij}$ of the additional routes are eliminated from the routes graph as it results from the clustering step 106 if one or more of the following conditions occur:

the travel time of the segment is shorter than a threshold, i.e., if $$T_{S_i} = \sum_{k,l \in S_{ij}} T_{kl} < \Theta_S$$

there are no traffic events considered severe associated with the arcs composing $S_{ij}$;
the overall delay of the segment is lesser than a selected threshold:

$$D_{S_i} = \sum_{k,l \in S_i} D_{kl} < \Theta_D$$

Eliminating One of the Faster Routes

As explained above, in accordance with an embodiment, it is possible to identify on the routes graph $G^P$ a plurality of faster routes. In many cases, one of the faster routes is redundant, because it differs slightly, in terms of arrival times, from the other two, or is not very different. In this case, it is better to eliminate it, so as to simplify the newscast.

Preferably, the elimination algorithm performed in the second sub-step of step 107 comprises the following operations:

a) the main routes are sorted out by increasing arrival time $P_i$, i=1 . . . 3;
b) $P_3$ is considered, which is compared to others and eliminated if at least one of the following conditions occurs:

the arrival time $T_{P_3}$ thereof differs in percentage from that of one of the other $T_{P_i}$ for a value lower than a threshold:

$$1 - \frac{T_{P_3}}{T_{P_i}} < \Theta_E$$

the ratio of the length of the uncommon parts with the length of the common ones is greater than a selected threshold:

$$\frac{\|P_i \cap P_3\|}{\|P_i \cup P_3\|} > \Theta_L$$

there are no traffic events of severity greater than a threshold $\Theta_G$ and the delay on the arcs not covered by other routes does not exceed a selected threshold:

$$D_{P_i^D} = \sum_{kl \in P_i - \bigcup_{j \neq i} P_j} D_{kl} < \Theta_D$$

c) the same procedure is repeated for $P_2$;

Merging Decision and/or Joining Nodes

Sometimes, the decision and joining nodes are so close that the presence thereof does not add relevant information and complicates the narration of the newscast.

To avoid this drawback, in the third sub-step of step 107 two decision and/or joining nodes $N_i, N_j \in G^P$ united by a segment $S_k$ are merged if the travel time of $S_k$, $T_{S_k}$ is shorter than a selected threshold $\Theta_S$.

With reference again to FIG. 1, in accordance with an advantageous embodiment, the data processing method 100, after the clustering step 106, and after the possible further simplifying step 107, comprises a step of generating a text 108 of the newscast in natural language.

Such a text is generated from the routes graph as it results from the simplification performed in the clustering step 106 and in the possible further simplification performed in step 107. Such a graph will henceforth be defined, for brevity, simplified routes graph $G^S$.

With regard to the structure of the newscast whose text is generated in step 108, in accordance with an embodiment, this is preferably made according to a template selected from a plurality of possible templates on the basis of the following features:

- the algorithm for sorting out the sequence of news items associated with the segments of the routes graph;
- the criteria for grouping the description of similar and/or adjacent events;
- the modes for describing events on typical and habitual routes;
- the dictionary used for the description of the events, i.e., the sentences describing the events and the grammatical constructs used to join them in a meaningful speech.

Preferably, the choice of the template is made on the basis of one or more parameters chosen from those listed below:

- the structure of the routes graph, for example according to the number of decision nodes and according to the features of the arcs;
- user preferences, for example, the length of the newscast and the style;
- the presence of particularly severe anomalies on the routes.

For example, the sections constituting the templates are:
- the introduction, dedicated to greetings and any sponsors;
- the general description of the traffic situation and of the expected short-term evolution;
- the description of the main routes and of the arrival times;
- the description of traffic anomalies (events and congestions) along each of the main routes;

the description of traffic anomalies on the typical route and on the route preferred by the user;

the description of any situations of particular severity or relevance, for example messages from the civil protection authorities;

the conclusion.

The newscast structure sections may be sorted out in any way and not all sections are always present.

In accordance with an advantageous embodiment, the step of generating 108 the language of the newscast comprises one or more of the sub-steps listed below:

1. Creating the sequence of news items;
2. Clustering and ranking news items;
3. Generating the sentences in the desired language.

In relation to sub-step 1, it should be noted that the order in which the events are presented in the newscast affects the comprehensibility thereof for the end user. It is possible to provide different criteria for sorting out the sequence of news items which, for example, are selected according to the style of the newscast. For example, it is possible to provide the sorting criteria listed below:

sorting based on routes;
sorting based on distance;
sorting based on the severity of the event.

For example, if the sequence sorting is based on routes, the procedure is as follows:

1. The segments of the fastest route are described;
2. the segments of the second and of the third fastest routes, which have not yet been described, are described;
3. the segments of the typical route, which have not yet been described, are described;
4. the segments of the user's route, which have not yet been described, are described.

An alternative approach is to follow a sorting criterion based on distance, i.e., to describe the segments in increasing order of distance from the departure node. If two segments have the same distance, they are described in order of route: those belonging to the fastest route are described first.

Finally, the segments may be described in the order dictated by the severity of the event, defined as follows:

the maximum delay on the segment, due to congestion;
the severity set by the operator for traffic and weather events.

With regard to the sub-step 2 of the step of generating the language of the newscast 108, the following should be noted. The traffic newscast preferably has a maximum number of news items $N_x$ set a priori, so as to constrain the length thereof within acceptable limits even during peak hours. $N_x$ is an integer greater than or equal to 1.

It is therefore appropriate to eliminate or group events to remain within the event limit $N_x$. This is preferably performed in the sub-step 2 of ranking and clustering traffic events, comprising, in fact, an operation of ranking and/or an operation of clustering the traffic events.

The ranking operation consists in assigning, to each news item in the simplified routes graph $G^P$, a numerical coefficient proportional to the relative relevance of the traffic information in the newscast. The function calculating the ranking accepts an input vector containing the annotated arcs composing the news item, and generates a real number.

The function may vary according to the style and on the type of the newscast. An example of ranking function for congestions is as follows:

$$R_{E_i} = w_d \cdot \frac{D_{E_i}}{\max_i D_{P_i}}$$

where $D_{E_i}$ is the delay caused by the event $E_i$ and $D_{P_i}$ is the overall delay on the route $P_i$.

An example of ranking function for events is as follows:

$$R_{E_i} = w_g \cdot \frac{G_{E_i}}{G_x}$$

where $G_{E_i}$ is the severity of the event $E_i$ and $G_x$ is the maximum value which the severity of an event may take.

The coefficients $w_d$ and $w_g$ depend on the distance of the event from the departure point and serve to give a higher ranking to the events closer to the user.

With regard to the operation of grouping traffic events, this may be performed by means of two criteria:

grouping traffic events based on the toponym;
grouping traffic events based on the type of event.

The two abovementioned criteria may be adopted individually or in combination with each other.

In the grouping based on the toponym, traffic events which are on the same toponym and on the same segment are grouped up to a maximum number of $N_T$ events.

The news items to be sorted out are chosen in increasing order of ranking, so that the most relevant events are grouped less frequently.

In the grouping based on the type of traffic event, events which are on the same segment and are of the same type (e.g., congestions, works, etc.) are grouped up to a maximum number of $N_T$ events. The news items to be sorted out are chosen in increasing order of ranking, so that the most relevant traffic events are grouped less frequently.

In accordance with a preferred embodiment, if, after the activity of clustering and ranking traffic events, the number of events exceeds the value $N_x$, those in excess may be discarded in increasing order of ranking.

The data processing method 100 preferably comprises a step of speech synthesizing 109 the newscast from the text generated in step 108. Such a speech synthesizing step allows to generate sentences in the desired language (e.g., English or Italian), which also includes the possible annotation thereof with elements used by a TTS (Text To Speech) synthesis engine to insert breaks, improve pronunciation and change the intonation of sentences, so as to give the newscast a more human connotation.

Preferably, in step 108, templates are used, which contain a skeleton of the translation of each type of news item, and an expert system based on rules for the management of genders (masculine, feminine and neutral) and numbers (singular and plural) and for the concatenation of sentences, performed by adding conjunctions and punctuation.

A critical aspect of generating natural language, performed in step 108, is the verbal description of the geographical position of the events, which is crucial for the comprehensibility (and hence the usefulness) of the newscast.

The description of the position of an event consists of three elements:

the road where the event or congestion occurs;
the landmarks, i.e., reference points which have a high probability of being known by the user and which identify the head and the tail of the problem to be reported;

each road is identified by a toponym, i.e., an official name given by the authority managing the road network and contained in the topological graph $G^T$.

During the clustering step 106 it is possible that arcs with different toponyms are grouped; therefore, criteria become appropriate for choosing the one most adapted to represent the position.

In accordance with an embodiment, in the step of generating the language of the newscast 108 the following algorithm is used for the choice of the toponyms:

a relevance coefficient is calculated for each of the present toponyms, proportional to the FRC and to the length of the segment characterized by the respective toponym;

if one of the toponyms has a relevance coefficient much greater than that of the others, then it is used to describe the road segment;

otherwise, the two toponyms which have the greatest relevance coefficients are used.

Figure 3:
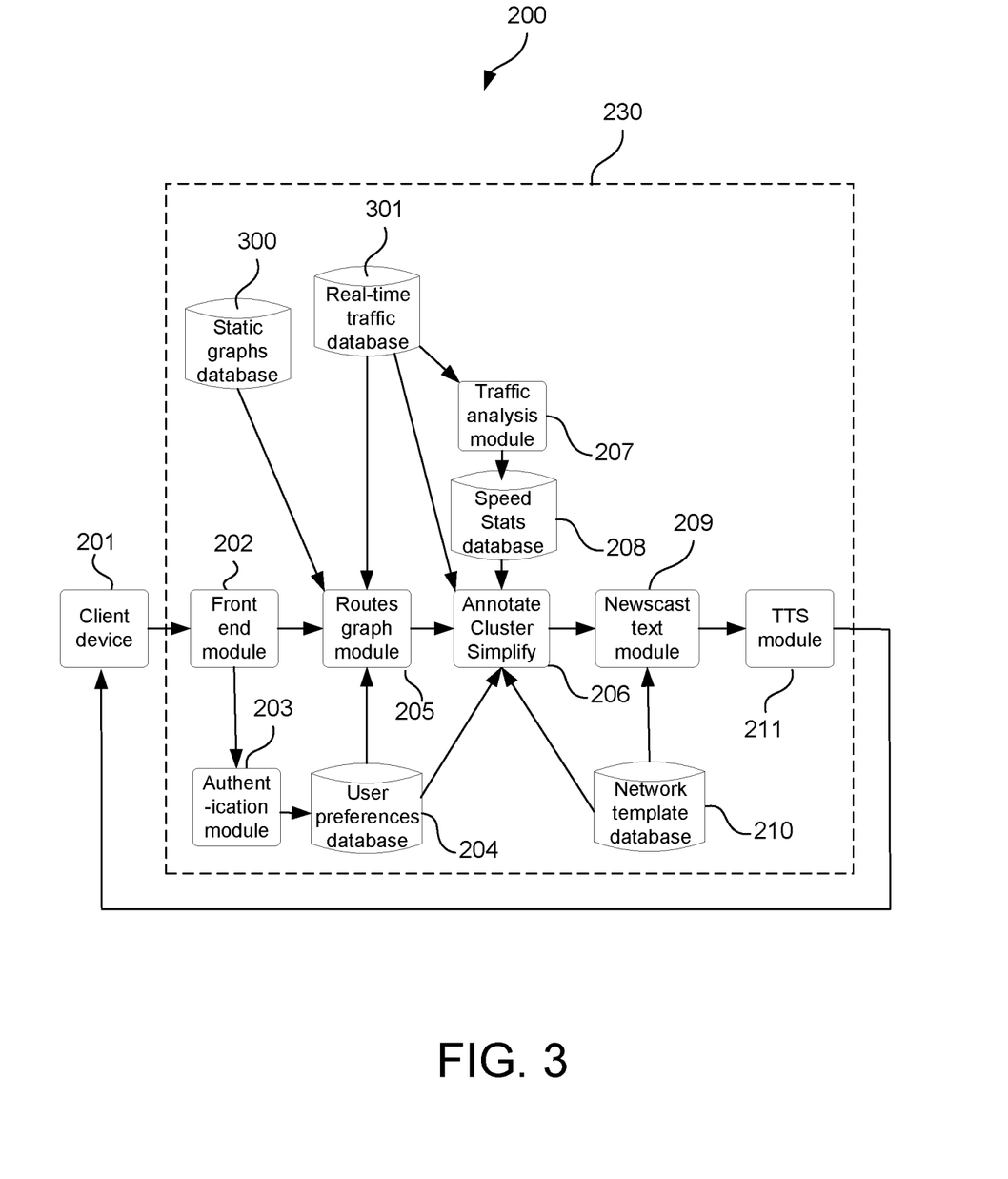
FIG. 3 shows a block diagram of a non-limiting example of a computer system by which the data processing method described herein may be implemented.

FIG. 3 shows the block diagram of an advantageous and non-limiting embodiment of a computer system 200 by means of which the data processing method 100 described above may be implemented.

The aforesaid system 200 comprises at least one client 201 and at least one server 230. The client 201 and the server 230 are operatively connectible to each other by means of a wireless network, for example, a wireless data network of a mobile telephone network operator. The client 201 is, for example, a smartphone, or a dedicated hardware and software device, on which an application program is installed, designed to forward service requests to the server 230 and designed to provide a user with customized traffic information.

The server 230 comprises a front end module 202 configured to receive the service requests sent by the client 201. Such service requests are essentially requests for customized traffic information which are precisely synthesized by the data processing method 100 described above, but they may also include mere requests for updating the user profile and/or preferences. In accordance with an embodiment, the requests for customized traffic information comprise, for example, data identifying the departure location and data identifying the destination location.

The server 230 preferably comprises an authentication module 203 designed to identify and authenticate the user from which both types of requests described above originate. Furthermore, such an authentication module 203 may directly fulfill requests for updating the user profile and/or preferences, for example, by updating a user preferences database 204, included in the server 230 or connected thereto.

The server 230 comprises a module 205 for generating the routes graph $G^P$ to which, upon successful authentication, the requests for customized traffic information are forwarded.

The routes graph generating module 205 is adapted and configured to obtain, for example, from a graphs database 300, data defining a topological graph G. As explained above, the topological graph G is an oriented graph containing information on the connection between segments of a road network and comprises nodes which represent points of connection between two adjacent segments and arcs which connect nodes and which correspond to road or carriageway segments. In other words, the module 205 is designed to perform step 104 of the data processing method 100. The static graphs database 300 contains data adapted to define static graphs (such as the topological graph G and the geometric graph) used by the system 200. For example, such data are acquired by one or more external suppliers of map data. The module 205 is adapted and configured to access the static graphs database 300.

The module 205 is also adapted and configured to generate data defining the routes graph $G^P$. As explained above, the routes graph $G^P$ is a subset of the topological graph G, having a departure node 10 associated with the departure position, a destination node 20 associated with the destination position, intermediate nodes between the departure node 10 and the destination node 20, arcs 1-5 which connect the nodes of the routes graph to one another. To this end, the module 205 is adapted and configured to perform an operation of identifying on the routes graph $G^P$ a plurality of alternative routes which extend from the departure node 10 to the destination node 20 of the routes graph passing through intermediate nodes and arcs of the routes graph $G^P$. In other words, the module 205 is also essentially designed to perform step 104 of the data processing method 100. To this end, the module 205 is also such as to obtain data from the user preferences database 204 and from a further database included in the system 200, in particular, from the real-time traffic data database 301. The data obtained are preferably data on the average speed on the arcs of the routes graph $G^P$. For example, such data are acquired by one or more external suppliers of traffic data.

The server 230 further comprises a module 206 for processing the routes graph $G^P$ substantially designed to perform the operations of the annotation 105, clustering 106 and further simplification 107 steps described above and therefore to obtain the simplified and annotated routes graph. To this end, the module 206 is such as to receive data from the module 205 adapted to define the routes graph. To perform the aforesaid steps, the module 206 may obtain data from the real-time traffic data database 301, from the user preferences database 204 and from two further databases preferably provided in the system 200:

The database of speed statistics 208;

The database of the templates 210 of the traffic newscasts.

In accordance with an embodiment, the server 230 also comprises a traffic data analysis module 207, which, from the data obtained from the real-time traffic data database 301, is such as to produce speed statistics data stored in the database 208.

The server 230 preferably comprises a module 209 for generating the natural language text of the traffic newscast adapted to perform step 108, described above, of the data processing method 100. Such a module 209 receives in input from the module 206 the data adapted to define the simplified and annotated routes graph. Since the newscast text may depend on the template of the newscast itself, the module 209 may obtain the data contained in the newscast template database 210.

Finally, the server 230 preferably comprises a TTS (Text To Speech) module 211 adapted to receive the traffic newscast text from the module 209 and send the newscast, preferably in the form of an audio stream, to the client 201. Alternatively, the TTS module 211 may be provided on board the client 201, and in this case it may be the module 209 sending the newscast text to the client 201.

From the above description, it is possible to understand how the data processing method of the type described above fully achieves the intended objects.

In fact, experimental tests have allowed to ascertain that the data processing method described above allows to synthesize, in real time, intelligible and customized traffic information.

Obviously, in order to meet contingent and specific needs, those skilled in the art may make several changes and variations to the method described above, which changes and variations fall within the scope of protection of the invention as defined by the following claims.

The invention claimed is:

1. A data processing method for synthesizing in real time by a server data processing device customized traffic information for a user to reach a destination position from a departure position and for sending said customized traffic information through a wireless network by the server data processing device to a user's client data processing device, the client data processing device being a smartphone or a dedicated hardware and software device installed or carried onboard of a vehicle, the server data processing device comprising at least one computing device comprising at least one hardware processor, the data processing method comprising:

establishing by said client data processing device said departure position by automatically detecting said departure position by means of a satellite positioning system;

sending, through said wireless network, by the client data processing device to the server data processing device a service request for customized traffic information, said service request comprising data identifying said established departure position;

obtaining, by the at least one computing device, data which define a topological graph, said topological graph being an oriented graph containing information on the connection between segments of a road network, said topological graph comprising nodes which represent points of connection between two adjacent segments and arcs which connect nodes and which correspond to road or carriageway segments;

generating, by the at least one computing device, data which define a routes graph, the routes graph being a subset of the topological graph, and having a departure node associated with the departure position, a destination node associated with the destination position, intermediate nodes between the departure node and the destination node, and arcs which connect the nodes of the routes graph to one another, wherein generating data comprises an operation of identifying on the routes graph a plurality of alternative routes which extend from the departure node to the destination node of the routes graph passing through intermediate nodes and arcs of the routes graph;

noting, by the at least one computing device, traffic data, weather data, or both on the routes graph and obtaining data adapted to define an annotated routes graph;

obtaining, by the at least one computing device, data adapted to define a simplified routes graph reducing the number of intermediate nodes of the annotated routes graph by defining aggregate segments as sequences of arcs of the same alternative route which meet one or more homogeneity criteria of the traffic data, weather data, or a combination thereof; and obtaining, by the at least one computing device, said customized traffic information from said simplified routes graph and sending said customized traffic information to said client data processing device through said wireless network.

2. The data processing method according to claim 1, wherein said plurality of alternative routes comprise at least a first route which is the fastest, on a basis of real-time travel data, and at least a second route which is a route habitually chosen by the user.

3. The data processing method according to claim 2, wherein said plurality of alternative routes comprise a third route calculated on a basis of statistical data of typical speed with empty road network.

4. The data processing method according to claim 3, wherein said third route is the route which is the fastest when calculated on the basis of statistical data of typical speed with empty road network.

5. The data processing method according to claim 1, wherein obtaining data adapted to define the simplified routes graph comprises an operation of eliminating arcs which are traffic-free.

6. The data processing method according to claim 1, wherein aggregated segments comprising adjacent arcs having mutually homogeneous traffic levels are defined in obtaining data adapted to define the simplified routes graph.

7. The data processing method according to claim 1, wherein obtaining data adapted to define the simplified routes graph comprises defining aggregated segments comprising adjacent arcs having mutually heterogeneous traffic levels.

8. The data processing method according to claim 1, further comprising generating, by at least one computing device, a text of a natural language traffic newscast from the simplified routes graph.

9. The data processing method according to claim 8, wherein said natural language traffic newscast has a structure made according to a template selected from a plurality of possible templates.

10. The data processing method according to claim 9, wherein said template is selected on a basis of one or more parameters chosen from a group consisting of:
a structure of the simplified routes graph;
a user preference; and
a presence of particularly severe anomalies on the routes.

11. The data processing method according to claim 8, further comprising synthesizing speech of the natural language traffic newscast from said text.

12. The data processing method according to claim 1, wherein obtaining data adapted to define the simplified routes graph comprises performing at least one iterative algorithm for reducing the number of intermediate nodes.

13. The data processing method according to claim 1, wherein said routes graph comprises at least one of: decision nodes, joining nodes, and alternative routes, and wherein after obtaining data adapted to define the simplified routes graph, the data processing method further comprises simplifying, by at least one computing device, the simplified routes graph comprising one or more of:
simplifying alternative routes;
eliminating an alternative route; and
merging decision nodes, joining nodes, or both.

14. The data processing method according to claim 1, wherein noting traffic data, weather data, or both on the routes graph further comprises noting toponymic data on the routes graph.

15. The data processing method according to claim 14, wherein the homogeneity criteria also relate to toponymic data.

16. A non-transitory computer-readable computer product comprising program code executable in one or more computing devices that, when executed, directs the one or more computing devices to:

establish by a client data processing device said departure position by automatically detecting said departure position by means of a satellite positioning system;

send, through a wireless network, by the client data processing device to a server data processing device a service request for customized traffic information, said service request comprising data identifying said established departure position;

obtain data which define a topological graph, the topological graph being an oriented graph containing information on the connection between segments of a road network, the topological graph comprising nodes which represent points of connection between two adjacent segments and arcs which connect nodes and which correspond to road or carriageway segments;

generate data which define a routes graph, the routes graph being a subset of the topological graph, and having a departure node associated with the departure position, a destination node associated with the destination position, intermediate nodes between the departure node and the destination node, and arcs which connect the nodes of the routes graph to one another, wherein generating the data comprises identifying on the routes graph a plurality of alternative routes which extend from the departure node to the destination node of the routes graph passing through intermediate nodes and arcs of the routes graph;

display traffic data, weather data, or a combination thereof on the routes graph;

obtain data adapted to define an annotated routes graph;

obtain data adapted to define a simplified routes graph reducing a number of intermediate nodes of the annotated routes graph by defining aggregate segments as sequences of arcs of the same alternative route which meet one or more homogeneity criteria of the traffic data, the weather data, or the combination thereof; and obtain said customized traffic information from said simplified routes graph and sending said customized traffic information to said client data processing device through said wireless network.

* * * * *